(12) United States Patent
Sugiyama et al.

(10) Patent No.: US 11,407,151 B2
(45) Date of Patent: Aug. 9, 2022

(54) VEHICULAR RESIN MOLDED ARTICLE

(71) Applicant: Koito Manufacturing Co., Ltd., Tokyo (JP)

(72) Inventors: Kenta Sugiyama, Shizuoka (JP); Masashi Katayama, Shizuoka (JP); Yuichi Ikeya, Shizuoka (JP); Hiroyoshi Oi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 226 days.

(21) Appl. No.: 16/722,014

(22) Filed: Dec. 20, 2019

(65) Prior Publication Data

US 2020/0206992 A1 Jul. 2, 2020

(30) Foreign Application Priority Data

Dec. 28, 2018 (JP) .............................. JP2018-246548

(51) Int. Cl.
   *B29C 45/27* (2006.01)
   *B29C 45/00* (2006.01)
   *B29L 31/30* (2006.01)

(52) U.S. Cl.
   CPC ...... *B29C 45/0025* (2013.01); *B29C 45/2708* (2013.01); *B29C 2045/0027* (2013.01); *B29L 2031/30* (2013.01)

(58) Field of Classification Search
   None
   See application file for complete search history.

(56) References Cited

U.S. PATENT DOCUMENTS

2006/0065998 A1\* 3/2006 Takigawa ............ B29C 45/2608
264/132

FOREIGN PATENT DOCUMENTS

JP 2017-052105 A 3/2017

\* cited by examiner

*Primary Examiner* — Monica A Huson
*Assistant Examiner* — Kelsey C Grace
(74) *Attorney, Agent, or Firm* — Venjuris, P.C.

(57) ABSTRACT

A vehicular resin molded article is formed by solidifying a molten resin filled in a cavity of an injection mold and having a concave gate mark formed by a valve pin and remaining thereon in which L/T is 190 or more where L is a flow distance of the molten resin from the gate mark to a filling terminal and T is a maximum thickness. When the valve pin is moved to the cavity side and is pressed against the molten resin, since the contact area of a tip end portion with respect to the molten resin in the vehicular resin molded article increases and the temperature of the tip end portion in the valve pin tends to decrease, the portion of the vehicular resin molded article where the valve pin is pressed against is sufficiently solidified and string drawing or silver streak is less likely to occur.

8 Claims, 6 Drawing Sheets

VEHICULAR RESIN MOLDED ARTICLE

CROSS-REFERENCE TO RELATED APPLICATIONS

This application is based on and claims priority from Japanese Patent Application No. 2018-246548, filed on Dec. 28, 2018, with the Japan Patent Office, the disclosure of which is incorporated herein in its entirety by reference.

TECHNICAL FIELD

The present disclosure relates to a technical field of a vehicular resin molded article formed by solidifying a molten resin filled in a cavity of an injection mold.

BACKGROUND

There is an injection mold that includes a fixed die and a movable die, and forms a molded article by filling a cavity which is a space defined by both the fixed die and the movable die with a molten resin. Each component of a vehicle lamp may be formed as a vehicular resin molded article by the injection mold (see, e.g., Japanese Patent Laid-Open Publication No. 2017-052105).

Such an injection mold is provided therein with a structure called a hot runner system which flows the molten resin toward the cavity while heating the molten resin by a heater, and the molten resin flows inside a hot runner and passes through a gate from a discharge hole formed in a tip end portion of the hot runner to fill the cavity.

A valve pin is supported by the hot runner so as to be movable in the flow direction of the molten resin. In a state where the cavity is defined by abutting the fixed die and the movable die, filling of the molten resin into the cavity from the hot runner is started when the valve pin is moved to the opposite side of the cavity and the discharge hole is opened, and the filling of the molten resin into the cavity from the hot runner is completed when the valve pin is moved to the cavity side and the discharge hole is closed.

When the valve pin is moved to the cavity side and the filling of the molten resin into the cavity from the hot runner is completed, a tip end portion of the valve pin is pressed against the molten resin filling the cavity. In a state where the molten resin is solidified and taken out from the injection mold to form a vehicular resin molded article, a concave gate mark is formed on the portion of the vehicular resin molded article where the tip end portion of the valve pin is pressed against.

Since the tip end surface of the valve pin is formed in a planar shape and the tip end portion of the valve pin is slightly pushed into the molten resin, the gate mark remains on the vehicular resin molded article as a shallow recess.

SUMMARY

The vehicular resin molded article formed by the injection mold may be formed in various shapes or sizes, and the temperature of the molten resin may also be set in different ways according to, for example, the shape or size of the vehicular resin molded article.

For example, when forming a thin vehicular resin molded article, since the flow distance of the molten resin from the gate mark to a filling terminal tends to increase as compared to the thickness, the temperature of the molten resin is set to a high temperature of, for example, about 340° C. in order to increase fluidity of the molten resin in the cavity.

However, when the vehicular resin molded article is formed using such a high-temperature molten resin, the tip end portion of the valve pin may also become a high temperature due to transfer of heat from the molten resin, the portion of the vehicular resin molded article where the valve pin is pressed against may not be sufficiently solidified, and a portion of the molten resin may remain adhered to the tip end portion of the valve pin spaced apart from the molten resin. When a portion of the molten resin adheres to the tip end portion of the valve pin, so-called "string drawing" in which a thread-shaped resin hangs down from the tip end portion of the valve pin or so-called "silver streak" in which a silver mark is generated on the surface of a molded article occurs, and moldability of the vehicular resin molded article is lowered.

Accordingly, a vehicular resin molded article of the present disclosure aims at improving moldability.

First, a vehicular resin molded article according to the present disclosure is a vehicular resin molded article formed by solidifying a molten resin filled in a cavity of an injection mold and having a concave gate mark formed by a valve pin and remaining thereon in which L/T is 190 or more where L is a flow distance of the molten resin from the gate mark to a filling terminal and T is a maximum thickness, in which an outer opening edge of the gate mark is formed as a flat portion having a planar shape, and in which a ratio of a maximum depth to a diameter of the gate mark is set to 20% or more.

Thus, when the valve pin is moved to the cavity side and is pressed against the molten resin, the contact area of a tip end portion with respect to the molten resin in the vehicular resin molded article increases and the temperature of the tip end portion of the valve pin tends to decrease.

Second, in the vehicular resin molded article according to the present disclosure described above, a surface of the gate mark may be formed in a curved surface shape.

Thus, the portion where the gate mark remains has a shape in which stress concentration hardly occurs.

Third, in the vehicular resin molded article according to the present disclosure described above, the surface of the gate mark may be formed in a spherical surface shape.

Thus, since the depth of the gate mark with respect to the diameter may be made sufficiently large, the contact area of the tip end portion of the valve pin with respect to the molten resin is sufficiently increased.

Fourth, in the vehicular resin molded article according to the present disclosure described above, a surface of the gate mark may be formed in a conical surface shape.

Thus, the outer surface of the tip end portion of the valve pin is inclined at a consistent angle with respect to the movement direction of the valve pin.

Fifth, in the vehicular resin molded article according to the present disclosure described above, a portion where the gate mark remains may be provided as a filling start end portion, and a thickness of the filling start end portion may be set to 4 mm or less.

Thus, the thickness of the filling start end portion is thin and correspondingly, the amount of the molten resin filling the filling start end portion is reduced.

According to the present disclosure, when the valve pin is moved to the cavity side and is pressed against the molten resin, the contact area of a tip end portion with respect to the molten resin in the vehicular resin molded article increases and the temperature of the tip end portion of the valve pin tends to decrease. Thus, the portion of the vehicular resin molded article where the valve pin is pressed against is sufficiently solidified and string drawing or silver streak is less likely to occur. Therefore, moldability of the vehicular resin molded article may be improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, a form for implementing a vehicular resin molded article of the present disclosure will be described with reference to the accompanying drawings.

The vehicular resin molded article is formed by an injection mold, but in the following description, the vertical direction, the longitudinal direction, and the transverse direction are illustrated by defining the direction in which a fixed die and a movable die of the injection mold are separated from or abut to each other as the vertical direction. Moreover, the vertical direction, the longitudinal direction, and the transverse direction illustrated below are given for convenience of explanation, and the present disclosure is not applied as being limited to these directions.

First, the outline of a structure of an injection mold 1 will be described (see FIGS. 1 and 2).

Figure 1:
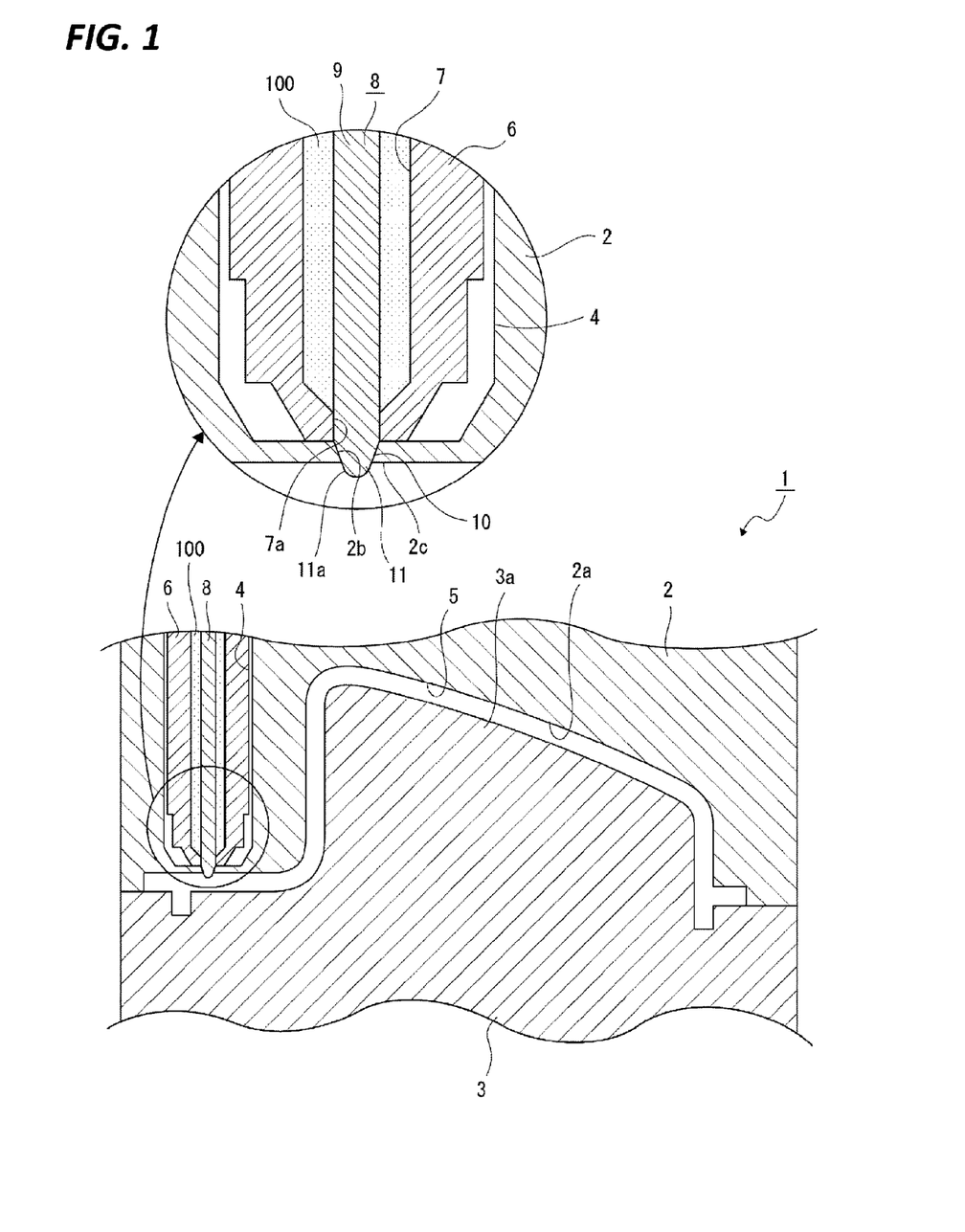
FIG. 1 is a cross-sectional view of an injection mold illustrating an embodiment of the present disclosure together with FIGS. 2 to 11.

The injection mold 1 includes a fixed die (core die) 2 and a movable die (cavity die) 3 which are separated from or abut to each other in the vertical direction (see FIG. 1).

An inner space is defined in the fixed die 2, and this inner space is an arrangement space 4. The fixed die 2 is formed with a concave portion 2a which is opened downward. A gate 2b is formed to vertically penetrate a lower end portion of the fixed die 2. The gate 2b communicates with the arrangement space 4.

The movable die 3 is moved in the vertical direction with respect to the fixed die 2 so as to be separated therefrom or abut thereto. The movable die 3 is provided with a convex portion 3a which protrudes upward. An ejector pin (not illustrated) is supported on the movable die 3 so as to be movable in the vertical direction.

When the movable die 3 is moved upward and is brought into contact with the fixed die 2, the convex portion 3a is combined with the concave portion 2a to define a cavity 5 therebetween.

A hot runner 6 is arranged in the arrangement space 4 of the fixed die 2. A flow path 7 is formed to vertically penetrate the hot runner 6. A lower end portion of the flow path 7 is formed as a discharge hole 7a having a smaller diameter than a remaining portion of the flow path 7. The discharge hole 7a in the hot runner 6 is positioned directly above the gate 2b of the fixed die 2.

A valve pin 8 which opens and closes the gate 2b is supported on the hot runner 6 so as to be movable in the vertical direction. The diameter of the valve pin 8 is smaller than the diameter of the flow path 7, and a space in which a molten resin 100 flows is formed in the flow path 7 on the outer peripheral side of the valve pin 8.

Figure 2:
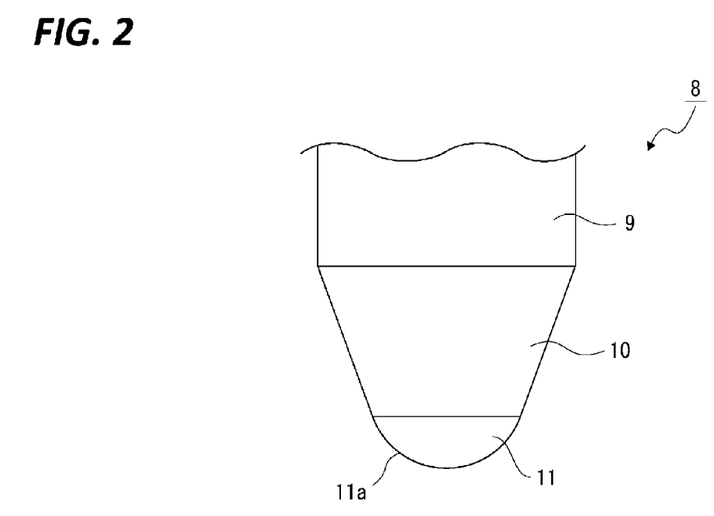
FIG. 2 is a front view illustrating a portion of a valve pin.

The valve pin 8 has a main shaft portion 9, an inclined portion 10, and a tip end portion 11 (see FIG. 2). The main shaft portion 9 has a constant outer diameter. The inclined portion 10 is continuous with the lower end of the main shaft portion 9 and is formed in a truncated conical shape such that the outer diameter thereof decreases with an increasing distance from the main shaft portion 9. The tip end portion 11 is continuous with the lower end of the inclined portion 10 and has an outer diameter that decreases with an increasing distance from the inclined portion 10. The outer surface of the tip end portion 11 is formed as a spherical surface 11a. Moreover, the outer surface of the tip end portion 11 is not limited to the spherical surface 11a, but may be formed in a curved surface shape which is convex downward.

Next, an operation when a vehicular resin molded article 20 is formed in the injection mold 1 will be described (see FIGS. 3 to 5).

In the injection mold 1, in a state where the fixed die 2 and the movable die 3 are separated from each other, the valve pin 8 is moved downward so that the discharge hole 7a in the hot runner 6 and the gate 2b of the fixed die 2 are closed by the valve pin 8.

Figure 3:
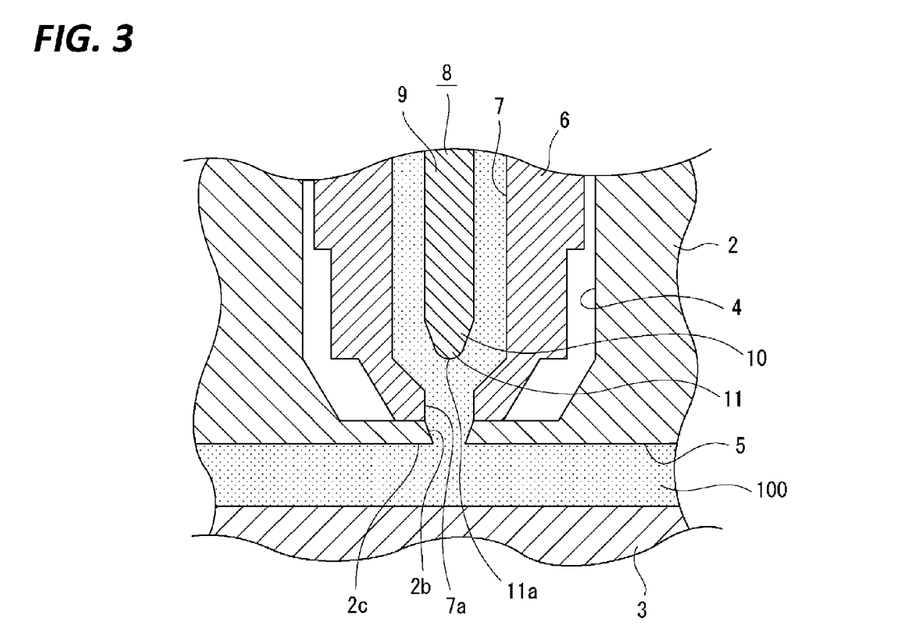
FIG. 3 is a cross-sectional view illustrating a state where a cavity is filled with a molten resin.

When the movable die 3 is moved upward with respect to the fixed die 2 so that the movable die 3 abuts to the fixed die 2, the cavity 5 is defined, and the valve pin 8 is moved upward so that the discharge hole 7a and the gate 2b are opened (see FIG. 3). When the valve pin 8 is moved upward so that the discharge hole 7a and the gate 2b are opened, the molten resin 100 flows in the space of the flow path 7 on the outer peripheral side of the valve pin 8 and fills the cavity 5 from the gate 2b through the discharge hole 7a.

At this time, since the molten resin 100 is set to a high temperature of, for example, about 340° C., the hot runner 6 or the tip end portion 11 of the valve pin 8 is also in a high temperature state due to transfer of heat from the molten resin 100. Meanwhile, since the fixed die 2 and the movable die 3 are not in a high temperature state unlike the hot runner 6 or the valve pin 8, the heat of the molten resin 100 filled in the cavity 5 is sufficiently and quickly transferred to the fixed die 2 and the movable die 3, so that the molten resin 100 is easily solidified.

Figure 4:
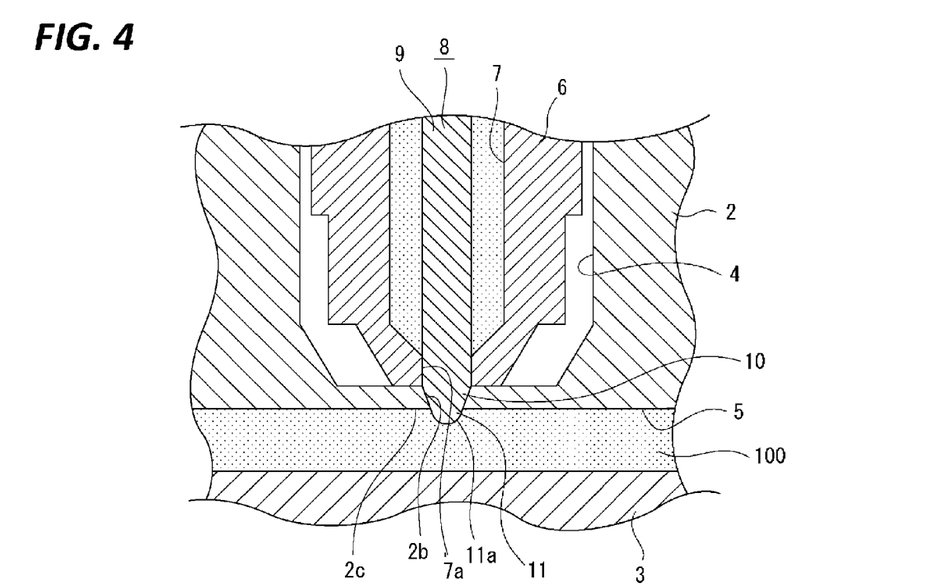
FIG. 4 is a cross-sectional view illustrating a state where a gate is closed by the valve pin in succession to FIG. 3.

When the cavity 5 is filled with the molten resin 100, the valve pin 8 is moved downward to close the discharge hole 7a and the gate 2b (see FIG. 4). Thus, discharge of the molten resin 100 from the hot runner 6 to the cavity 5 is stopped.

At this time, the tip end portion 11 of the valve pin 8 protrudes downward from the gate 2b, and the tip end portion 11 is positioned in the cavity 5 and is pressed against the molten resin 100.

The molten resin 100 filled in the cavity 5 is cooled and solidified since heat thereof is transferred to the fixed die 2 and the movable die 3.

Figure 5:
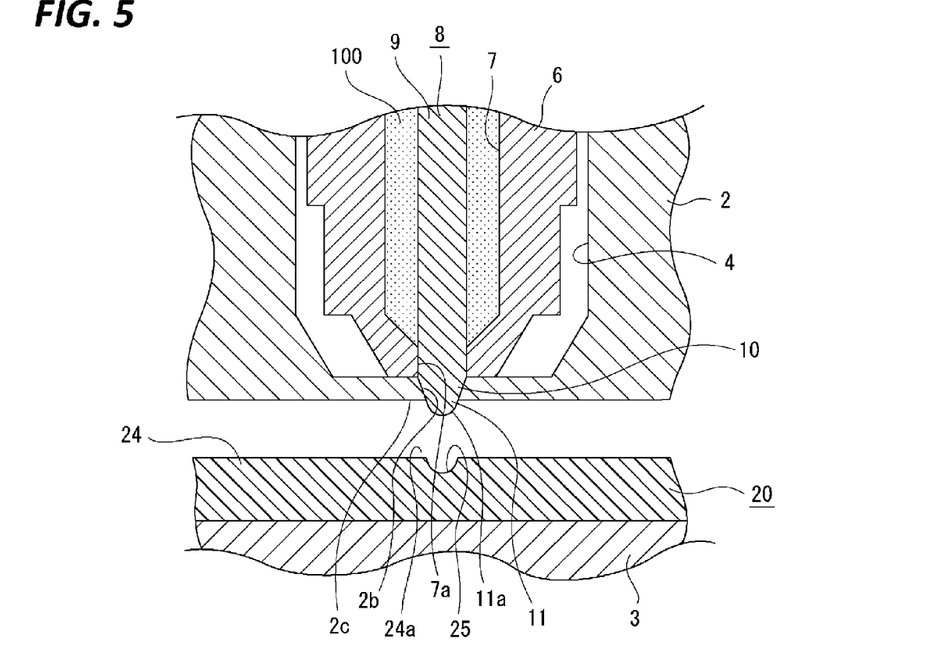
FIG. 5 is a cross-sectional view illustrating a state where a fixed die and a movable die are separated from each other in succession to FIG. 4.

When the molten resin 100 filled in the cavity 5 is cooled and solidified, the movable die 3 is moved downward and is spaced apart from the fixed die 2 (see FIG. 5). When the movable die 3 is spaced apart from the fixed die 2, the solidified molten resin 100 is ejected from the movable die 3 by the ejector pin and is taken out from the cavity 5 as the vehicular resin molded article 20.

Figure 6:
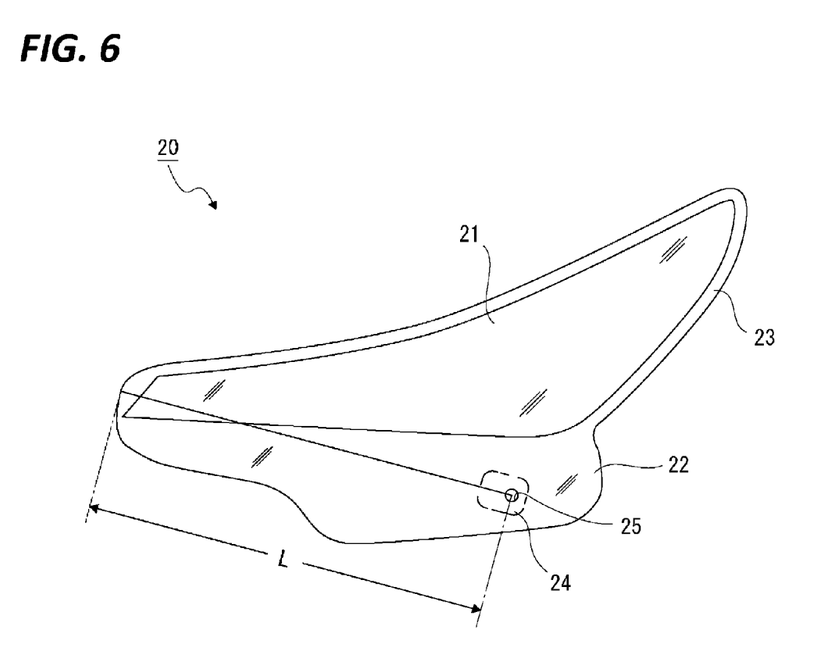
FIG. 6 is a front view of a vehicular resin molded article.

The vehicular resin molded article 20 is formed of a transparent material such as, for example, polycarbonate and functions as, for example, a cover (outer lens) attached to a lamp housing (see FIG. 6).

Moreover, the vehicular resin molded article 20 is not limited to the cover (outer lens), but may be, for example, an ornamental member or a decorative member called a front garnish in addition to an inner lens, an extension, and a reflector. The vehicular resin molded article 20 is not limited to a transparent material, but may be formed of any of various resin materials regardless of being colorless or colored.

The vehicular resin molded article 20 has a design portion 21 exposed when assembled to a vehicle body, a protruding portion 22 continuous with the design portion 21 to protrude from the design portion 21, and a circumferential portion 23 positioned around the design portion 21. The protruding portion 22 is a portion that is not exposed by being covered with, for example, a bumper in a state where the vehicular resin molded article 20 is assembled to the vehicle body, and the circumferential portion 23 is a portion that is bonded to the lamp housing by, for example, adhesion.

Figure 7:
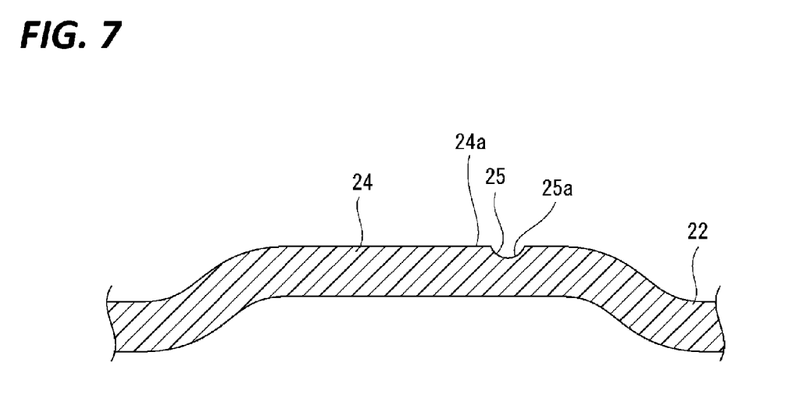
FIG. 7 is a cross-sectional view illustrating a filling start end portion of the vehicular resin molded article.

The protruding portion 22 is provided with a filling start end portion 24 which bulges in the thickness direction compared to a remaining portion of the protruding portion 22, and the filling start end portion 24 is formed, for example, in a substantially rectangular shape (see FIGS. 6 and 7). The filling start end portion 24 is a start portion when filling of the molten resin 100 is performed, and is a portion corresponding to the gate 2b. Thus, the tip end portion 11 of the valve pin 8 is pressed against the filling start end portion 24, and a concave gate mark 25 remains on the filling start end portion 24. The filling start end portion 24 has a thickness of, for example, 4 mm or less.

The filling start end portion 24 is formed as a flat portion 24a such that the outer opening edge of the gate mark 25 has a planar shape. The flat portion 24a is a portion formed by the surface (lower surface) 2c of the fixed die 2 around the gate 2b.

Figure 8:
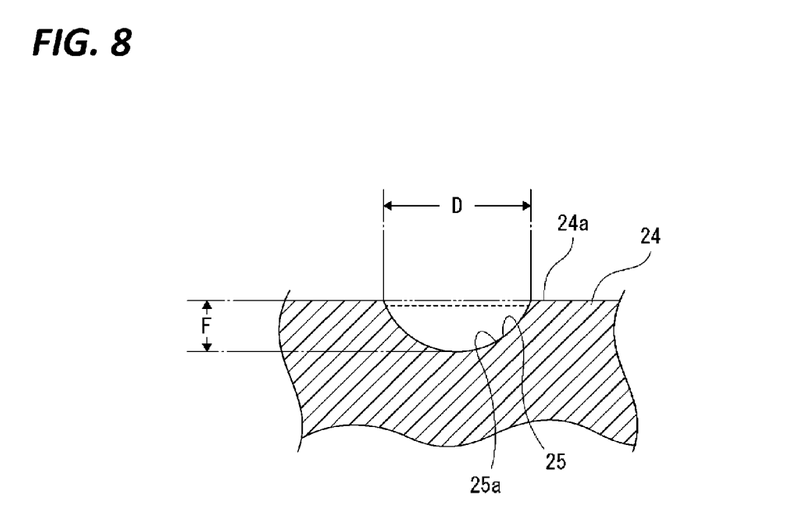
FIG. 8 is a cross-sectional view illustrating dimensions of a gate mark.

In the gate mark 25, the ratio of the maximum depth F to the diameter D is set to 20% or more (see FIG. 8). Since the gate mark 25 is formed by pressing the tip end portion 11 of the valve pin 8 having the spherical outer surface 11a, a surface 25a is formed in a concave spherical upper surface. However, when the outer surface of the tip end portion 11 of the valve pin 8 is formed in a curved surface other than the spherical surface 11a, the surface 25a of the gate mark 25 is also formed in a curved surface other than the spherical upper surface so as to imitate the outer surface of the tip end portion 11.

Moreover, generally, the tip end surface of the valve pin is formed in a planar shape, and the gate mark formed by pressing the valve pin having the planar tip end surface is formed at a position indicated by a dotted line in FIG. 8.

The vehicular resin molded article 20 formed as described above is a thin molded article in which L/T is 190 or more where L is a flow distance of the molten resin 100 from the gate mark 25 to a filling terminal and T is a maximum thickness. The filling terminal is a position where the molten resin 100 flowing through the cavity 5 finally flows, as well as a position where the distance from the gate 2b is the longest.

As described above, in the vehicular resin molded article 20, L/T is 190 or more where L is a flow distance of the molten resin 100 from the gate mark 25 to the filling terminal and T is a maximum thickness. The outer opening edge of the gate mark 25 is formed as the flat portion 24a having a planar shape, and the ratio of the maximum depth F to the diameter D of the gate mark 25 is 20% or more.

Accordingly, the ratio of the maximum depth F to the diameter D of the gate mark 25 is large, and when the valve pin 8 is moved to the cavity 5 side and is pressed against the molten resin 100, the contact area of the tip end portion 11 of the valve pin 8 with respect to the molten resin 100 is increased and the amount of heat transferred from the tip end portion 11 to the molten resin 100 is increased. In particular, since the heat of the molten resin 100 filled in the cavity 5 is sufficiently and quickly transferred to the fixed die 2 and the movable die 3 which are not in a high temperature state unlike the hot runner 6 or the valve pin 8, the temperature of the molten resin 100 filled in the cavity 5 is lower than the temperature of the tip end portion 11 of the valve pin 8, and the heat is easily transferred from the tip end portion 11 to the molten resin 100 filled in the cavity 5.

As a result, the temperature of the tip end portion 11 in the valve pin 8 is easily lowered, and the portion of the vehicular resin molded article 20 where the tip end portion 11 is pressed against is sufficiently solidified. Thus, in a state where the fixed die 2 and the movable die 3 are separated from each other and the valve pin 8 is spaced apart from the molten resin 100, the molten resin 100 is less likely to adhere to the tip end portion 11, and string drawing (stringing) or silver streak is less likely to occur. Therefore, moldability of the vehicular resin molded article 20 may be improved.

Further, since the surface 25a of the gate mark 25 is formed in a curved surface shape, the appearance may be improved and the portion where the gate mark 25 remains may have a shape in which stress concentration hardly occurs. Therefore, the high strength of the vehicular resin molded article 20 may be secured.

Furthermore, since the surface 25a of the gate mark 25 is formed in a curved surface shape so that the outer surface of the tip end portion 11 of the valve pin 8 is inclined with respect to the movement direction of the valve pin 8, when the fixed die 2 and the movable die 3 are separated from each other, the tip end portion 11 may be smoothly spaced apart from the molten resin 100 and the molten resin 100 may be made further less likely to adhere to the tip end portion 11.

In particular, since the surface 25a of the gate mark 25 is formed in a spherical surface shape so that the depth F with respect to the diameter D of the gate mark 25 may be made sufficiently large, the contact area of the tip end portion 11 with respect to the molten resin 100 may be sufficiently increased, the temperature of the tip end portion 11 may be more likely to decrease, and moldability of the vehicular resin molded article 20 may be further improved.

Furthermore, since the thickness of the filling start end portion 24 which is the portion of the vehicular resin molded article 20 where the gate mark 25 remains is set to 4 mm or less, the thickness of the filling start end portion 24 may be thin and correspondingly, the amount of the molten resin 100 filling the filling start end portion 24 may be small. Thus, the flow time of the molten resin 100 from the filling start end portion 24 to the filling terminal is shortened, and the molten resin 100 is hardly solidified during the flow thereof. Therefore, moldability of the vehicular resin molded article 20 may be improved due to good fluidity of the molten resin 100.

Moreover, as described above, the filling start end portion 24 is provided on the protruding portion 22 which is a portion covered with, for example, a bumper, so that the gate mark 25 is not exposed by being covered with the bumper in a state where the vehicular resin molded article 20 is assembled to the vehicular body. Accordingly, it is possible to form the filling start end portion 24 in a free shape and size without considering the appearance, and it is possible to improve the degree of freedom in designing the vehicular resin molded article 20. Further, the depth of the gate mark 25 may be increased, and the contact area of the tip end portion 11 with respect to the molten resin 100 may be increased to further improve moldability of the vehicular resin molded article 20.

Figure 9:
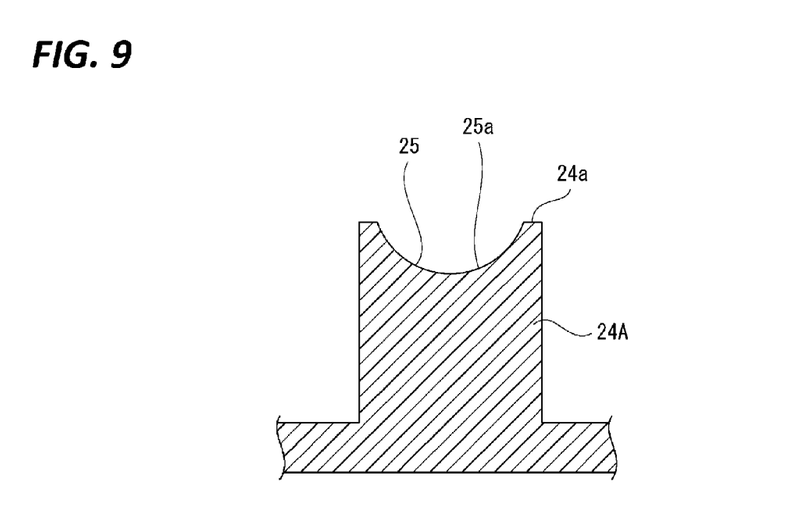
FIG. 9 is a cross-sectional view illustrating an example in which the gate mark is formed on the filling start end portion having a protrusion shape.

An example in which the valve pin 8 is pressed against the filling start end portion 24 having a substantially flat plate shape to form the gate mark 25 has been described above, but, for example, the valve pin 8 may be pressed against a filling start end portion 24A having a protrusion shape (sprue shape) to form the gate mark 25 (see FIG. 9).

Figure 10:
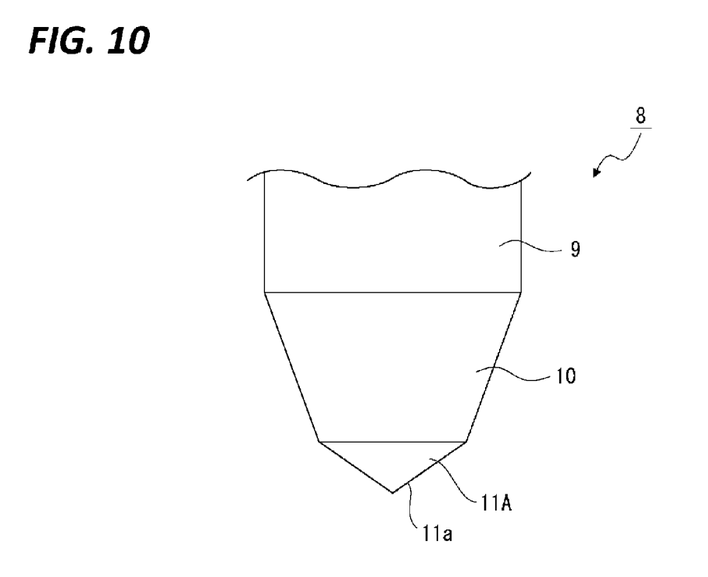
FIG. 10 is a front view illustrating an example of a valve pin having a conical tip end portion.

Further, an example in which the outer surface of the tip end portion 11 of the valve pin 8 is formed as the spherical surface 11a has been described above, but, for example, the valve pin 8 may be provided with a conical tip end portion 11A which protrudes downward (see FIG. 10). In this case, the surface 25a of the gate mark 25 may also be formed in a conical shape so as to imitate the outer surface of the tip end portion 11A, and the ratio of the maximum depth F to the diameter D of the gate mark 25 may be 20% or more (see FIG. 11).

Figure 11:
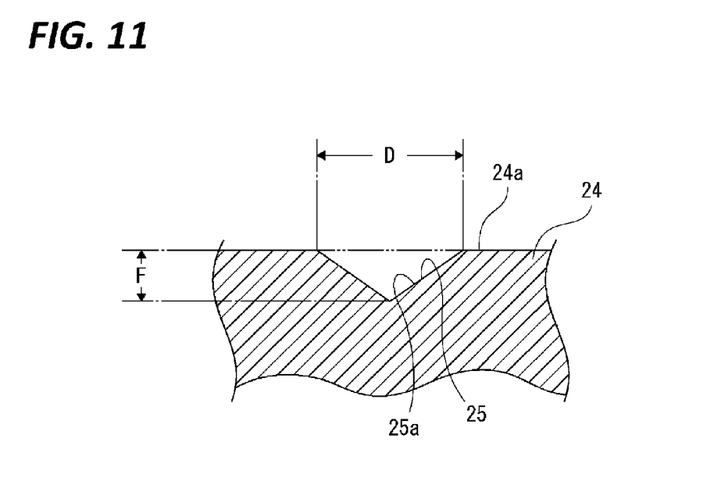
FIG. 11 is a cross-sectional view illustrating a gate mark formed by the valve pin having the conical tip end portion.

Since the outer surface of the tip end portion 11A is inclined at a consistent angle with respect to the movement direction of the valve pin 8 when the valve pin 8 having the conical tip end portion 11A is used, the tip end portion 11A may be smoothly spaced apart from the molten resin 100 when the fixed die 2 and the movable die 3 are separated from each other, and the molten resin 100 may be made further less likely to adhere to the tip end portion 11A.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicular resin molded article formed by solidifying a molten resin filled in a cavity of an injection mold and having a concave gate mark formed by a valve pin, wherein L/T is 190 or more where L is a flow distance of the molten resin from the gate mark to a filling terminal and T is a maximum thickness of the molten resin, an outer opening edge of the gate mark is formed as a flat portion in a planar shape, and a ratio of a maximum depth to a diameter of the gate mark is set to 20% or more.

2. The vehicular resin molded article according to claim 1, wherein the gate mark has a curved surface.

3. The vehicular resin molded article according to claim 1, wherein the gate mark has a spherical surface.

4. The vehicular resin molded article according to claim 1, wherein the gate mark has a conical surface.

5. The vehicular resin molded article according to claim 1, wherein a portion where the gate mark remains is provided as a filling start end portion, and a thickness of the filling start end portion is set to 4 mm or less.

6. The vehicular resin molded article according to claim 2, wherein a portion where the gate mark remains is provided as a filling start end portion, and a thickness of the filling start end portion is set to 4 mm or less.

7. The vehicular resin molded article according to claim 3, wherein a portion where the gate mark remains is provided as a filling start end portion, and a thickness of the filling start end portion is set to 4 mm or less.

8. The vehicular resin molded article according to claim 4, wherein a portion where the gate mark remains is provided as a filling start end portion, and a thickness of the filling start end portion is set to 4 mm or less.

* * * * *